United States Patent
Scott et al.

(10) Patent No.: US 9,213,923 B2
(45) Date of Patent: Dec. 15, 2015

(54) PRINTER CALIBRATION USING LIMITED RANGE REFLECTION SCANNERS AS INPUT SOURCES

(71) Applicant: Kodak Alaris Inc., Rochester, NY (US)

(72) Inventors: Kevin Craig Scott, Rochester, NY (US); Stuart Gerard Evans, Rochester, NY (US); Steven R. Schmidt, Rochester, NY (US)

(73) Assignee: KODAK ALARIS INC., Rochester, NY (US)

( * ) Notice: Subject to any disclaimer, the term of this patent is extended or adjusted under 35 U.S.C. 154(b) by 0 days.

(21) Appl. No.: 14/460,819

(22) Filed: Aug. 15, 2014

(65) Prior Publication Data

US 2015/0077766 A1    Mar. 19, 2015

Related U.S. Application Data

(60) Provisional application No. 61/867,302, filed on Aug. 19, 2013.

(51) Int. Cl.
| | |
|---|---|
| *G06K 15/02* | (2006.01) |
| *H04N 1/60* | (2006.01) |
| *G06K 15/00* | (2006.01) |

(52) U.S. Cl.
CPC .......... *G06K 15/027* (2013.01); *G06K 15/1878* (2013.01); *G06K 15/40* (2013.01); *H04N 1/60* (2013.01); *H04N 1/6033* (2013.01)

(58) Field of Classification Search
CPC ............................ G06K 15/027; H04N 1/6033
USPC ...................................... 358/406, 504; 399/49
See application file for complete search history.

(56) References Cited

U.S. PATENT DOCUMENTS

| | | | | |
|---|---|---|---|---|
| 5,950,043 | A | * | 9/1999 | Fujita et al. .................... 399/60 |
| 6,671,067 | B1 | | 12/2003 | Adam et al. |
| 6,909,814 | B1 | | 6/2005 | Nakajima |
| 7,319,545 | B2 | | 1/2008 | Linder et al. |
| 7,719,716 | B2 | | 5/2010 | Klassen |
| 8,203,768 | B2 | | 6/2012 | Klassen |

* cited by examiner

*Primary Examiner* — Eric A Rust
(74) *Attorney, Agent, or Firm* — Hogan Lovells US LLP

(57) ABSTRACT

A method of calibrating a printer using a reflective scanner is disclosed. Because the reflective scanner used for calibration may only be able to accurately measure a limited density range that is less than the full density range of the printer, some information from the reflective scanner is disregarded or deemphasized during the calibration process. A calibration page is printed and scanned. Lookup tables (LUTs) that comprise the printer calibration values are updated based on adjustments calculated from the scanner for density regions where the scanner produces relatively accurate measurements, but updated based on the preexisting settings for density regions where the scanner produces relatively inaccurate measurements. In transitions regions between accurate and inaccurate regions, the LUTs are adjusted based on a combination of measurements from the scanner and the preexisting settings.

16 Claims, 8 Drawing Sheets

FIG. 7a

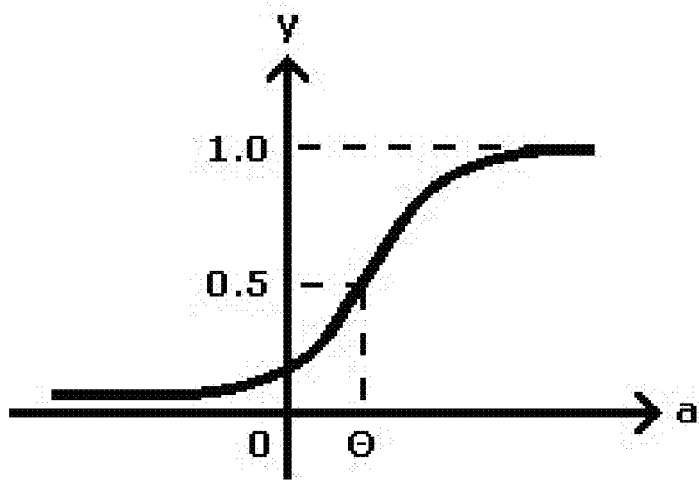

FIG. 7b $$y = \sigma(a) \equiv \frac{1}{1 + e^{-a/p}}$$

FIG. 7c $$y = \sigma(a) \equiv \frac{1}{1 + e^{-(a-\theta)/p}}$$

Graphs below-left use one or the sum of two sigmoid functions of the form -->

Here p, determines the shape of the sigmoid: a larger value making the curve flatter. In many texts, this parameter is omitted so that it is implicitly assigned the value 1. Units with this functionality are sometimes called semilinear units. A larger value of θ shifts the curve right.

PRINTER CALIBRATION USING LIMITED RANGE REFLECTION SCANNERS AS INPUT SOURCES

FIELD OF THE INVENTION

This invention relates generally to the field of printer calibration and more particularly to the process of using a reflection scanner characterized by model or type to perform printer calibrations.

BACKGROUND OF THE INVENTION

Printers, especially printers used to produce continuous tone or photographic images, require routine calibration to compensate for the use of different print media lots and types or the use of different inks, toners, donor ribbons, types and lots. Calibration also addresses printer electronics and components whose operating characteristics drift over time due to wear and usage.

Performing tone scale calibration for a printer requires that a plurality of printed patches on a target be measured by some means. The measurements are then processed through a calibration algorithm, which generates new printing parameters, such as a lookup table (LUT), to optimize the printed output. These measurements are usually made by an instrument that measures the reflective density, such as a densitometer or a spectrophotometer. Typically, the units of measurement are Status A density, which is a measure of the amount and or combinations of dyes or pigments present in a given patch. The calibration instrument's density measurement range is typically greater than the printer's own Dmin to Dmax density range. This greater range is desirable and required for most existing calibration methods, as the calibration instrument's measurements can be used to accurately and optimally calibrate the printer through its entire Dmin to Dmax density range.

However, there are several drawbacks to using these instruments for printer calibration. First, densitometers and spectrophotometers are expensive. They also require calibration themselves, require knowledgeable users and are ancillary equipment not used to produce prints or to scan hardcopy media digitalization or duplication. Lastly, densitometers and spectrophotometers use factory provided calibration targets, which are also expensive, and can be lost, damaged or degraded if they are improperly handled or stored. It is therefore desirable to be able to effectively use a less costly measurement device for printer calibration.

Reflective scanners, such as a flat-bed print scanner, can be utilized for this purpose and are readily available. However, these devices typically have a density measurement range that is smaller than that of the printer's output range and are not designed to produce a stable, invariant response across their entire response range. Reflective scanners measurements drift due to changes in lamp output, changes in electrical components, debris such as pollen and dust and film caused by off-gassing from plastic components within the scanner housing that collects on the underside of the scanner platen glass. In addition to variations due to drift over time and usage, scanners of this type vary between manufacturers and within productions lots.

It is known to use reflection scanners as input sources for printer calibration; however these techniques all have requirements that limit their accuracy and applicability.

U.S. Pat. No. 8,203,768 teaches a calibration method that includes scanning a test patch, which comprises a plurality of halftone cells, to obtain reflectance values, calculating subset averages of reflectance values as defined by an averaging window, and calculating an overall average based on the subset averages. This calculation pertains exclusively to halftone printing systems and integrates the halftone dot patterns to generate a reflectance value. The densitometers or spectrophotometers used in traditional printer calibration include an aperture that is typically around 5 mm in diameter, and the reflected light that passes through that aperture is optically averaged by the device. Reflection scanner based printer calibration for halftone images involves averaging values in some region analogous to the aperture of a spectrophotometer or densitometer.

U.S. Pat. No. 7,719,716 describes techniques for using a scanner to calibrate printers and requires that reflectance value be calculated for each patch on a test target. This method would preclude using test targets with patches that are within the gamut of the printer, but outside the accurate gamut of the scanner.

U.S. Pat. No. 7,319,545 assumes the scanner is a relatively stable measurement device and will remain in a state that is sufficiently close to its intended design such that it does not need to be characterized. The disclosure assumes that the drift associated with the printer will be much greater than the variability associated with the scanner. However, in reality, density measurement deviations for reflective scanners can be large in certain density regions, especially on worst case scanner types.

U.S. Pat. No. 6,909,814 describes converting data from an object scanner and then correcting that data whenever the object scanner response does not correspond to that of a standard scanner response. Every object scanner must be so characterized. Every object scanner must have a reference to compare it to the results of a standard scanner and this scanner calibration has to be done from time to time. It is impractical to correct every scanner on a routine basis.

U.S. Pat. No. 6,671,067 requires that a factory produced reference target and a printed target be scanned simultaneously, referred to as a "combined target." As previously discussed, factory provided calibration targets are expensive, can be lost, and can fade or be damaged if improperly handled or stored.

BRIEF DESCRIPTION OF THE DRAWINGS

FIG. 7a is a graph depicting the sigmoid function used to establish the operational and non-operational ranges of the scanner response;

FIG. 7b is a formula used to create the sigmoid function graph;

FIG. 7c is a formula used to adjust the slope position of the sigmoid function;

DETAILED DESCRIPTION OF THE INVENTION

Performing tone scale calibration for a printer usually requires that a plurality of printed patches on a target be measured by some means. The measurements are then processed through a calibration algorithm, which generates new printing parameters, such as a lookup table (LUT), to optimize the printed output. These measurements are usually made by an instrument which measures the reflective density, such as a densitometer or a spectrophotometer. Typically, the units of measurement are Status A density, which is a measure of the amount and or combinations of dyes or pigments present in a given patch. The instrument's density measurement range is typically greater than the printer's own Dmin to Dmax density range. This is desirable and required for most existing calibration methods, as the instrument's measurements can be used to accurately and optimally calibrate the printer through its entire Dmin to Dmax density range. Such reflective measuring instruments are typically costly. It is desirable to be able to effectively use a less costly device to make the measurements. Reflective scanners, such as a flatbed print scanner, can be utilized for this purpose and are readily available; however, these devices typically have a density measurement range that is smaller than that of the printer's output range.

There are a variety of reasons for a reflective scanner's limited range. At the mid-to-high density end, flare, platen glass contamination, electronic noise or a voltage offset on the CCD input can cause the density readings to be different than the actual print density, as measured with a more accurate instrument. At the low density end, a particular reflective scanner may not be able to accurately measure down to the printer's Dmin, clipping many of the low density patches to a code value 255. Thus, when using a reflective scanner as a calibration input source, typical calibration algorithms would be unable to accurately calibrate the printer's entire output density range.

This invention diminishes this problem when a limited range reflective scanner is present, and no specialized calibration instrument is available. The printer can be calibrated using target patch measurements from a reflective scanner, producing better printed results than if no instrumented calibration were performed at all. A novel calibration algorithm can allow for compromises outside of the characterized reflective scanner's density measurement range. The invention is described in detail with particular reference to certain preferred embodiments thereof, but it will be understood that variations and modifications can be effected within the spirit and scope of the invention.

Figure 1:
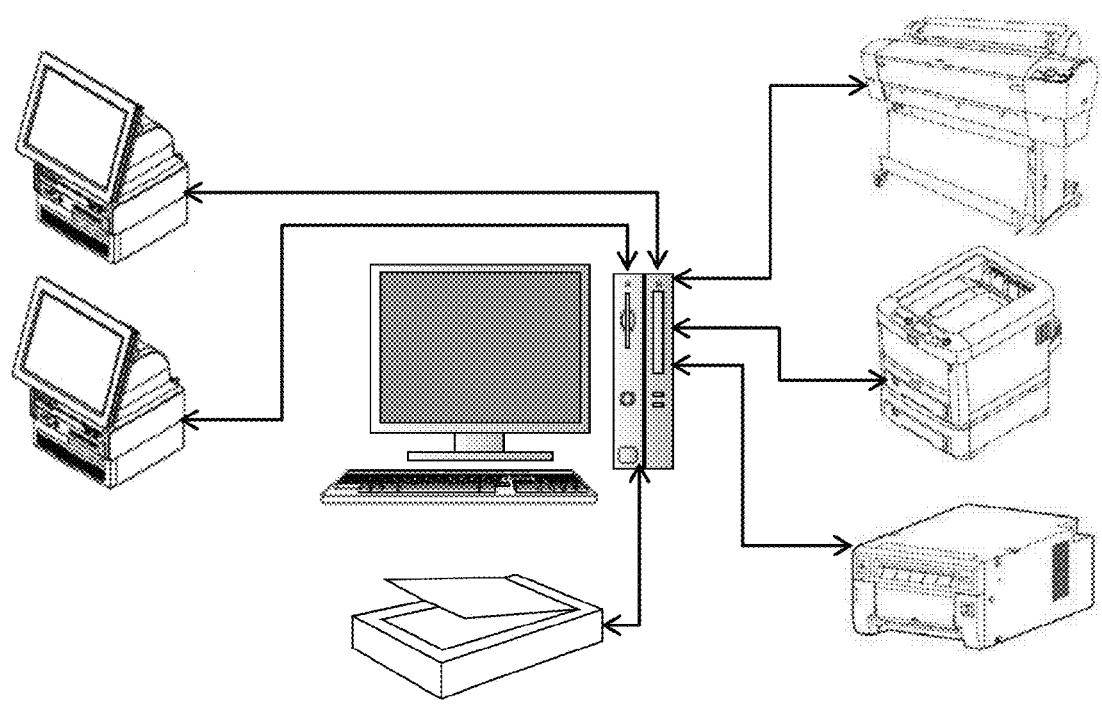
FIG. 1 illustrates a typical system for practicing the present invention.
Figure 2:
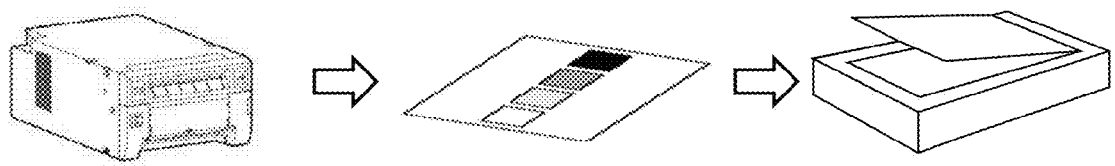
FIG. 2 illustrates a typical process for practicing the present invention.

FIG. 1 shows a typical system for practicing the present invention. FIG. 2 is a simplified illustration of the overall process of this invention, where in a printer renders a calibration target which is then scanned.

Figure 3:
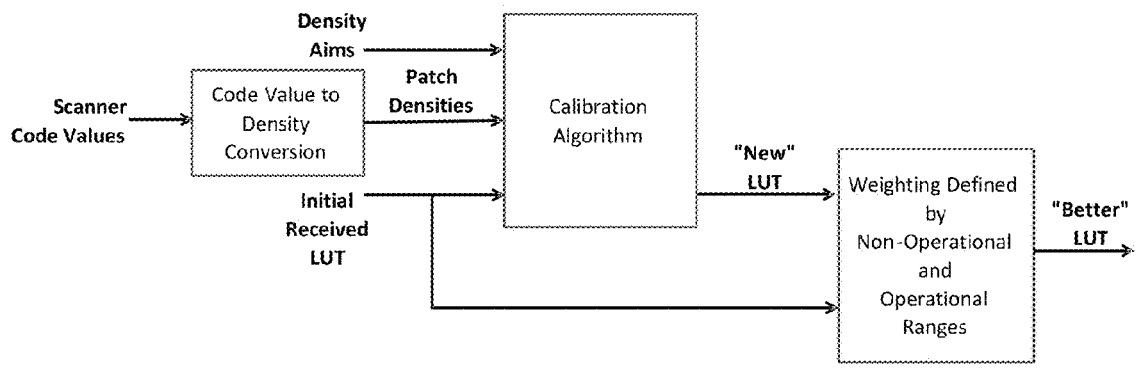
FIG. 3 is an overview flow diagram for calibrating a printer according to an embodiment of the present invention.

FIG. 3 is an overview flow diagram for calibrating a printer according to an embodiment of the present invention. The calibration algorithm takes three inputs, which are density aims, patch densities derived from scanner code values and the initial received LUT. The calibration algorithm generates a new LUT. A final, corrected LUT is generated by combining weighted combinations of the initial received LUT and the new LUT. The weighting of the new LUT versus the initial LUT is determined by the non-operational and operational ranges of the scanner.

Figure 4:
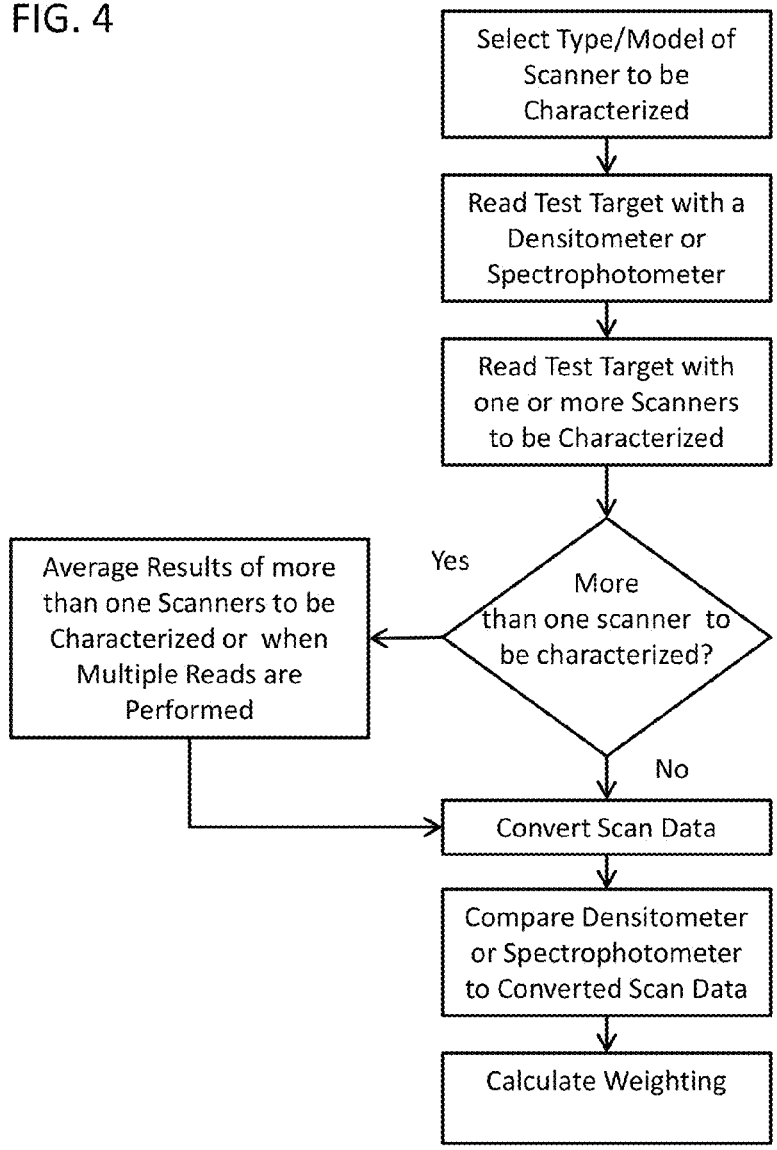
FIG. 4 is a flow diagram depicting the method for characterizing a scanner according to an embodiment of the present invention.

FIG. 4 is a flow diagram depicting the method for characterizing a scanner according to an embodiment of the present invention. First, a type and model of scanner to be characterized is selected. Second, a densitometer or spectrophotometer is used to read a test target. Third, the same test target is read by the scanner (or scanners) to be characterized. If multiple scanners are to be characterized, the results from the scanners may be averaged. The scan data is then converted and compared with the data from the densitometer or spectrophotometer. Lastly, a weighting is calculated from this comparison.

Figure 5A:
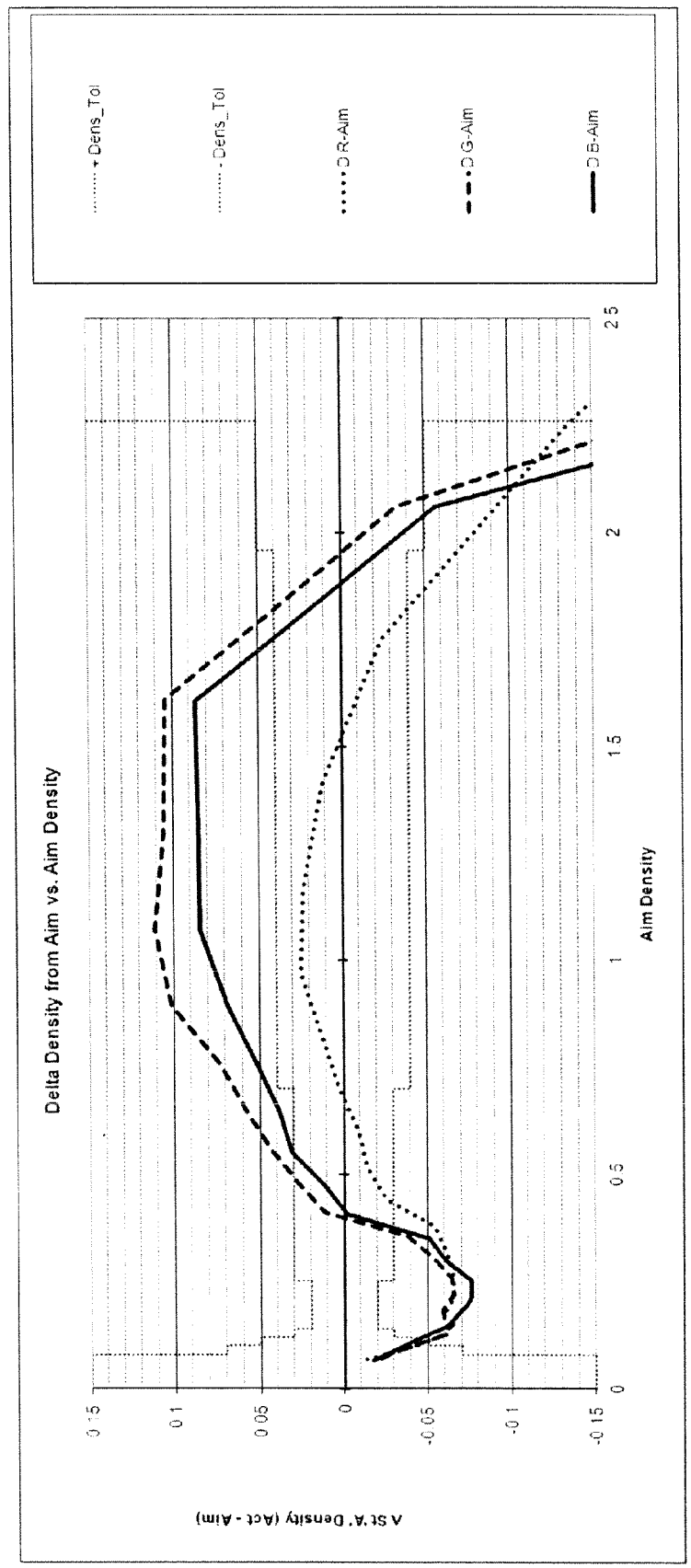
FIG. 5a is a graph depicting the response for a typical scanner that is out of tolerance.
Figure 5B:
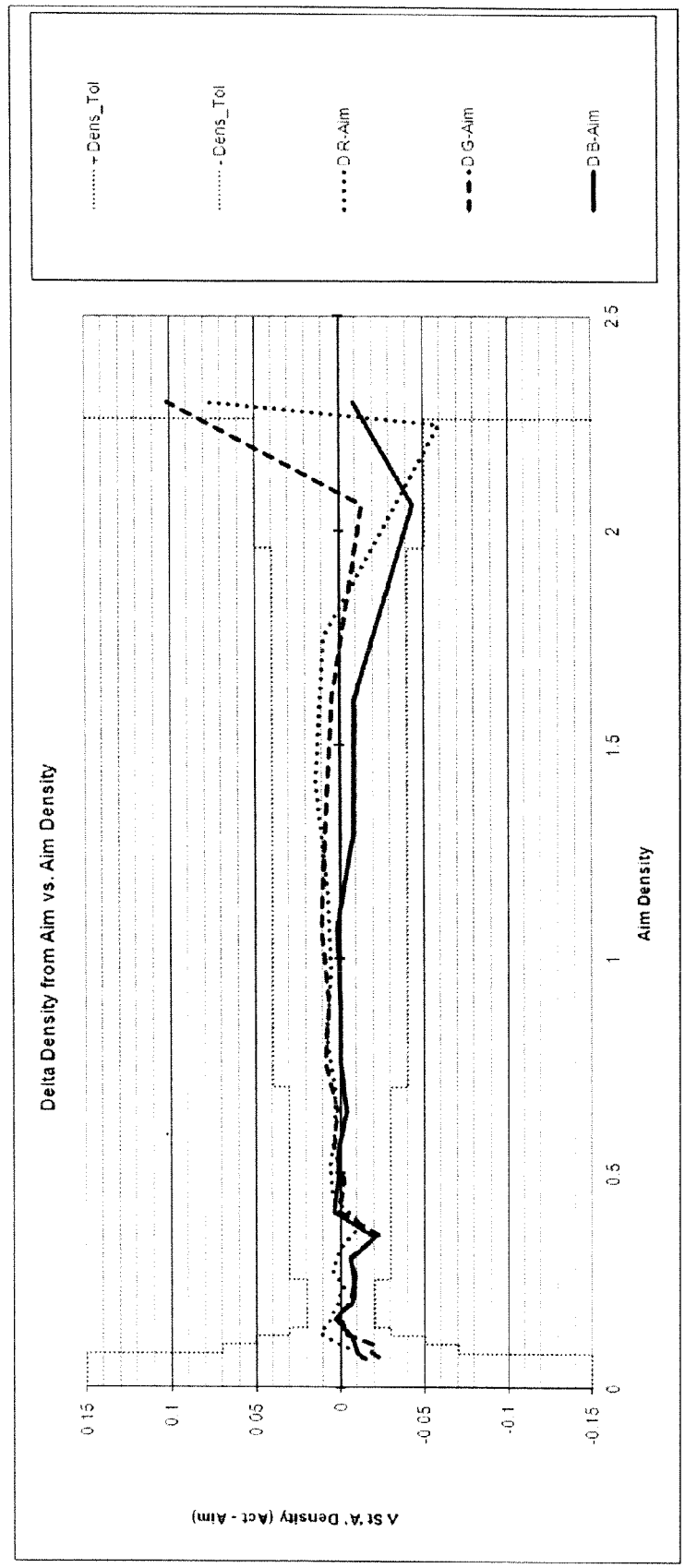
FIG. 5b is a graph depicting the response for a typical scanner that is near tolerance.

FIG. 5a is a graph depicting the response for a typical scanner that is out of tolerance. FIG. 5b is a graph depicting the response for a typical scanner that is near tolerance.

Figure 6:
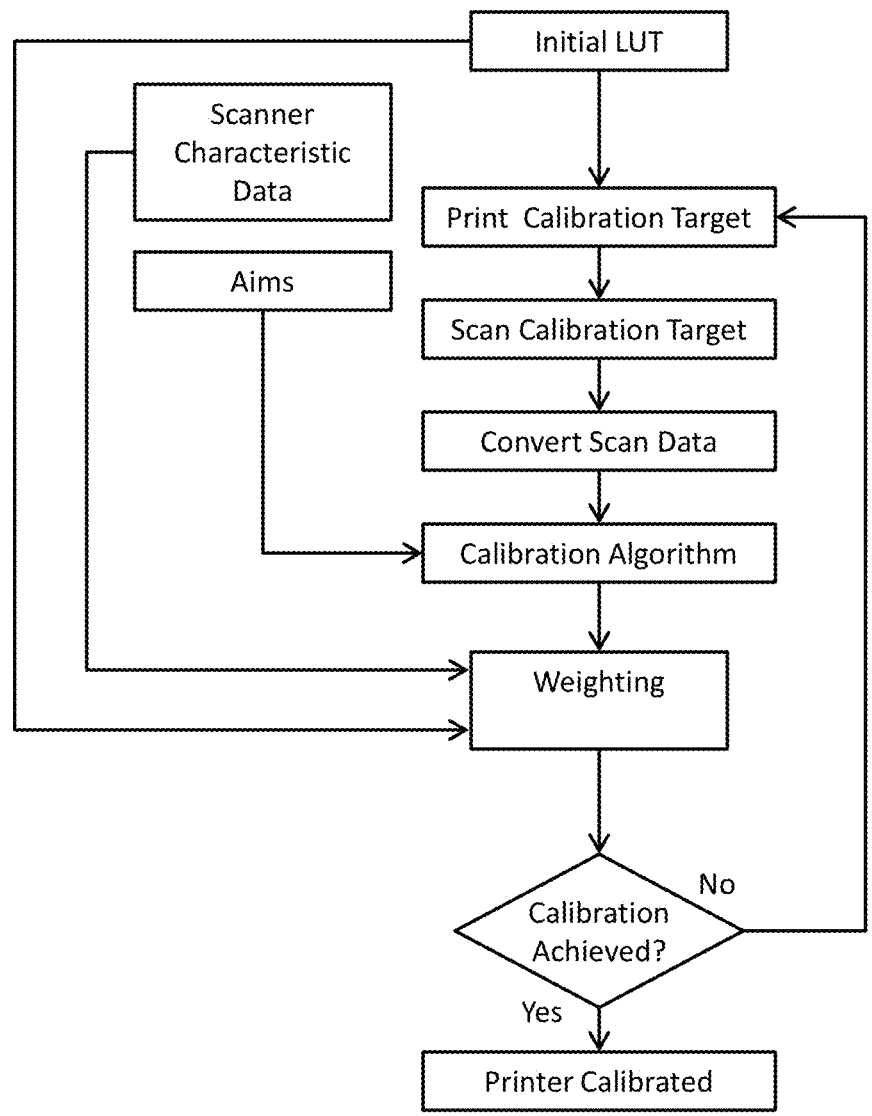
FIG. 6 is a flow diagram of the method for calibrating a printer according to an embodiment of the present invention.

FIG. 6 is a flow diagram of the method for calibrating a printer according to an embodiment of the present invention. The method begins with an initial LUT, scanner characteristic data (such as that generated by the process illustrated in FIG. 4) and density aim values. The first step in the method is printing a calibration target with the printer to be calibrated. Then, the calibration target is scanned with the scanner and the scan data is converted. Next, the calibration algorithm processes the converted scan data with the density aim values and provides output to the weighting step in the form of a new LUT. The weighting step operates on the new LUT and the initial LUT to create an corrected LUT. If the corrected LUT indicates that calibration is achieved, the process ends. Alternatively, if the corrected LUT indicates that calibration is not achieved, the process iterates (i.e., a new calibration target is printed and the steps are performed again).

Figure 8:
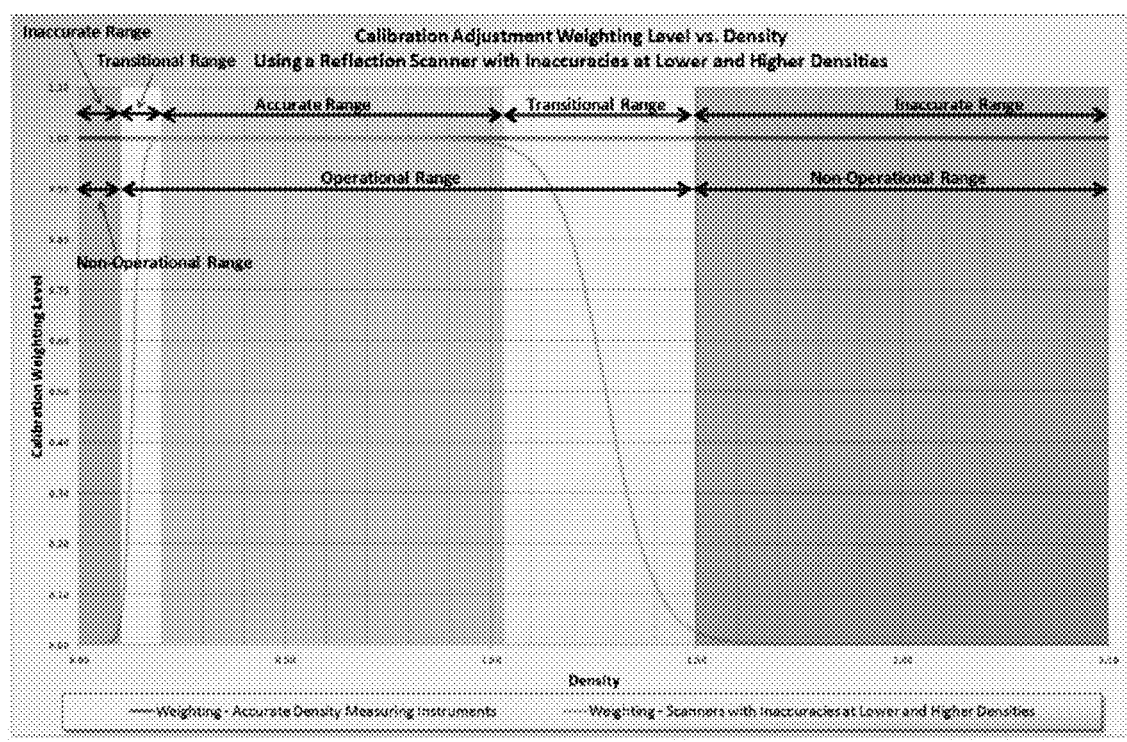
FIG. 8 is a graph depicting a sample calibration adjustment weighting level vs. density based on the sigmoid function.
Figure 9:
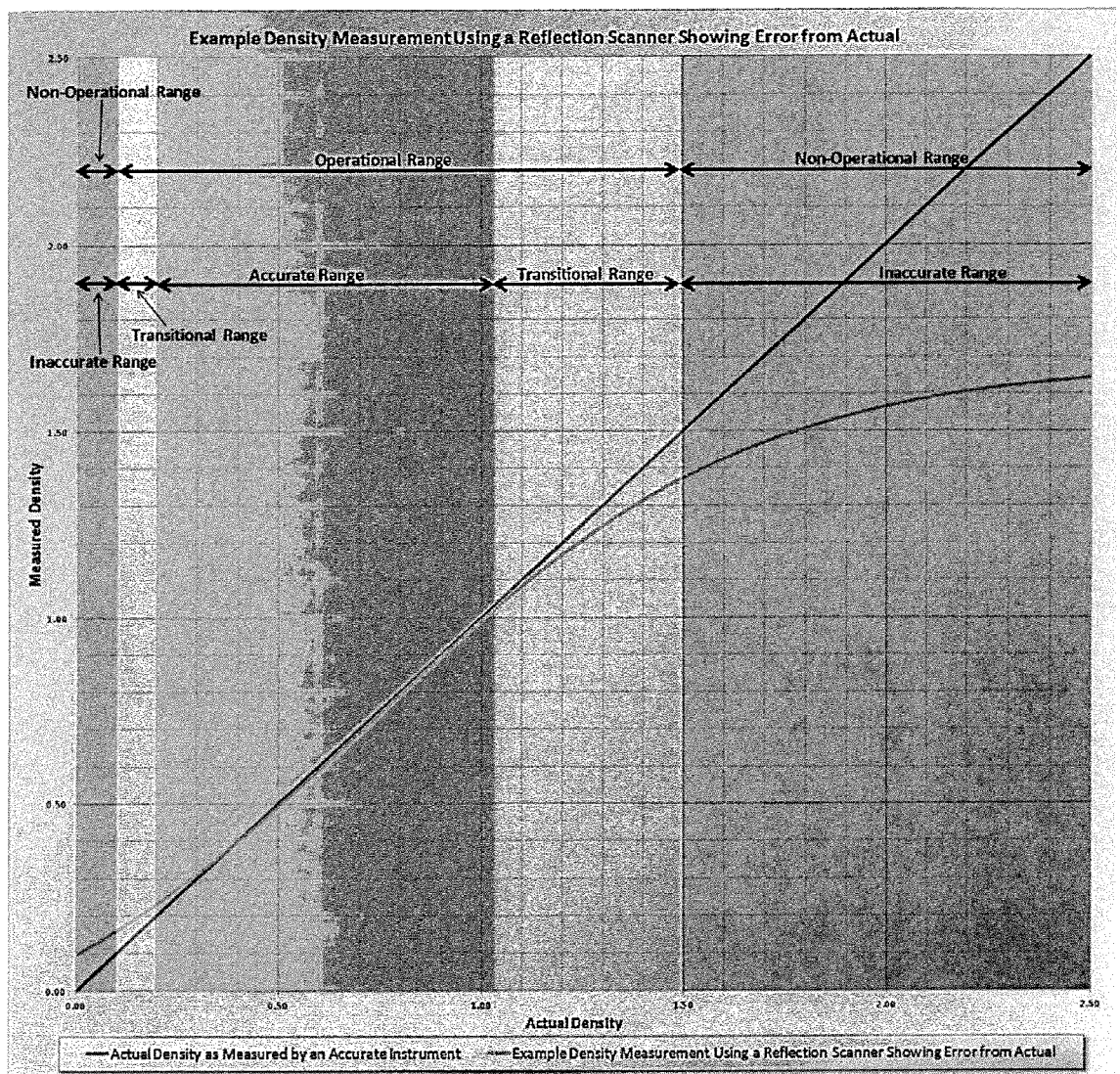
FIG. 9 is a graph depicting a sample density measurement showing error from the actual response.

In an embodiment of the present invention, a particular reflective scanner's range limitations are first characterized, using a target with known patch densities. This scanner range characterization is stored electronically in the printing system. The calibration algorithm then uses this characterization to diminish the calibration algorithm's applied adjustment. The applied adjustment will be tapered in some mathematical fashion, as the measured patch density range falls outside of the reflective scanner's accurate density measuring range. The measurement limitations of the scanner are due to various identifiable causes, allowing us to disregard the scanner information in a prorated manner in these regions. The accurate information can still be used to calibrate the printer's output to a better state than would be the case if no calibration were performed at all, while the prorating causes no visible discontinuity artifacts. Extrapolation may be used to fill-in the density regions, which are not accurately measured by the scanner. This will be done by mathematically "blending" the print scanner's density measurements, at the extremes of its accuracy range, with the printer's factory default calibration position at these locations, with the object being to remove any discontinuities from the resulting calibration. The resulting printed output will be "mostly" calibrated in the critical locations of human eye sensitivity within the print scanner's accurate density range, and will taper off to the printer's factory default calibration outside of this range. While not ideal, this approach results in printed output that is better than if no instrumented calibration were performed at all. FIG. 7a is a graph depicting the sigmoid function used to establish the operational and non-operational ranges of the scanner response for use with the weighting operation. FIG. 7b shows a formula that may be used to create the sigmoid function graph. FIG. 7c is a formula used to adjust the slope position of the sigmoid function. FIG. 8 is a graph depicting a sample calibration adjustment weighting level versus density based on the sigmoid function. FIG. 9 is a graph depicting a sample density measurement showing error from the actual response.

The invention may use a profile, created offline, which calculates Status A density from the scanner's reported RGB code values. The profile is created from the response of a "typical" scanner (i.e. center-of-population). Further, the "scanner characterization" necessary to the invention, may include finding a "worst case" scanner, of a particular model or type of scanner; where "worst case" is defined as that which deviates the most from actual Status A density, in one or more defined regions of the density measurement range such as between Status A densities of 1.0 and 2.5, and between Status A densities of 0.01 and 0.06. The "worst case" scanner may have excessive contamination on the underside of the glass, or other defect causing the deviation between actual and reported Status A densities.

The invention does not attempt to correct every portion of the printer's density range with the information from the scanner. Rather, for a particular type of scanner the inventive method may use the scanner data in certain density regions where that data corresponds to accurate ranges of that scanner type to generate a new or corrected printer LUT. Scanner data that is in certain density regions that correspond to the inaccurate ranges of that scanner are disregarded in favor of the initial LUT. The invention prorates the scanner data in certain density regions where that data corresponds to the transitional ranges of that scanner type (that occur between regions of relative accuracy and relative inaccuracy), using a portion of each of the new or corrected LUT and the initial LUT. The invention derives the accurate, transitional and inaccurate ranges from a particular "worst case" references scanner.

In some embodiments of this invention, color reflection scanners are characterized by model and manufacturer. In some embodiments, the color printer types include electrophotographic, thermal dye diffusion, inkjet, and digital photographic printers. Some embodiments of this invention may use measurement units such as Status A Densities, DIN Densities, or channel independent densities. In some embodiments, the chosen printer LUTs include the reference or current LUT that was used to print the calibration target, a reference LUT that corresponds to the factory defaults, and a new LUT that is calculated from the measurement units obtained from the scanner.

The invention claimed is:

1. A method for calibrating a printer using a color reflection scanner as a measurement device, comprising;
   providing a range of operational densities of the printer;
   receiving a range of operational densities of the color reflection scanner;
   receiving a calibration target printed using the printer, the calibration target having at least two density levels;
   receiving an initial lookup table used to print the calibration target;
   using the color reflection scanner to read the calibration target to obtain scanner output code values from the scanner;
   using a processor to generate a new lookup table based on the scanner output code values and the initial lookup table;
   using the processor to calculate a corrected lookup table based on a combination of the initial lookup table and the new lookup table by weighting portions of the new lookup table more heavily for densities that correspond to the range of operational densities of the scanner and weighting portions of the initial lookup table more heavily for densities that correspond to the range of non-operational densities of the scanner; and
   calibrating the printer using the corrected lookup table.

2. The method according to claim 1 wherein the calibration target is generated using a plurality of patches.

3. The method according to claim 1 wherein the calibration target has at least three density levels.

4. The method according to claim 1 wherein generating the new lookup table further includes converting the scanner code values into measurement units including Status A densities.

5. The method according to claim 1 wherein generating the new lookup table further includes converting the scanner code values into measurement units.

6. The method according to claim 1 wherein generating the new lookup table further includes converting the scanner code values into measurement units including channel independent densities.

7. The method according to claim 1 further including dividing the range of operational densities of the scanner into at least one accurate portion and at least one transitional portion.

8. The method according to claim 1 wherein the step of calculating the corrected lookup table further includes using the new lookup table as the corrected lookup table when the densities correspond to the accurate portion of the range of operational densities of the color reflection scanner.

9. The method according to claim 1 wherein the step of calculating the corrected lookup table further includes using the initial lookup table as the corrected lookup table when the densities correspond to the range of non-operational densities of the color reflection scanner.

10. A system for calibrating a printer using a calibration target generated by the printer, the system comprising:
    a color reflection scanner;
    a processor configured to
    receive a range of operational densities of the printer;
    receive a range of operational densities of the color reflection scanner;
    receive an initial lookup table used to print the calibration target;
    receive scanner output code values from the scanner corresponding to the calibration target;
    generate a new lookup table based on the scanner output code values and the initial lookup table;
    calculate a corrected lookup table based on a combination of the initial lookup table and the new lookup table by weighting portions of the new lookup table more heavily for densities that correspond to the range of operational densities of the scanner and weighting portions of the initial lookup table more heavily for densities that correspond to the range of non-operational densities of the scanner.

11. The system of claim 10 wherein the processor is additionally configured to convert the scanner code values into measurement units including Status A densities.

12. The system of claim 10 wherein the processor is additionally configured to convert the scanner code values into measurement units.

13. The system of claim 10 wherein the processor is additionally configured to divide the range of operational densities of the scanner into at least one accurate portion and at least one transitional portion.

14. The system of claim 10 wherein the processor is additionally configured to calculate the corrected lookup table by using the new lookup table as the corrected lookup table when the densities correspond to the accurate portion of the range of operational densities of the color reflection scanner.

15. The system of claim 10 wherein the processor is additionally configured to calculate the corrected lookup table by using the initial lookup table as the corrected lookup table when the densities correspond to the range of non-operational densities of the color reflection scanner.

16. The system of claim 10 wherein the processor is additionally configured to convert the scanner code values into measurement units including channel independent densities.

* * * * *